US006940998B2

(12) United States Patent
Garoutte

(10) Patent No.: US 6,940,998 B2
(45) Date of Patent: Sep. 6, 2005

(54) SYSTEM FOR AUTOMATED SCREENING OF SECURITY CAMERAS

(75) Inventor: Maurice V. Garoutte, Dittmer, MO (US)

(73) Assignee: Cernium, Inc., Webster Groves, MO (US)

(*) Notice: Subject to any disclaimer, the term of this patent is extended or adjusted under 35 U.S.C. 154(b) by 722 days.

(21) Appl. No.: 09/773,475

(22) Filed: Feb. 1, 2001

(65) Prior Publication Data

US 2001/0033330 A1 Oct. 25, 2001

Related U.S. Application Data

(60) Provisional application No. 60/180,323, filed on Feb. 4, 2000.

(51) Int. Cl.[7] .................................................. G06K 9/00
(52) U.S. Cl. ........................ 382/103; 382/165; 382/269; 348/154; 348/169
(58) Field of Search ............................ 382/103, 171, 382/173, 194, 205, 273, 269, 274, 165, 107, 162, 221; 348/154, 169, 143; 375/240.16; 342/66, 74; 235/411

(56) References Cited

U.S. PATENT DOCUMENTS

| 4,081,830 | A | | 3/1978 | Mick et al. |
| 4,737,847 | A | | 4/1988 | Araki et al. |
| 4,777,526 | A | | 10/1988 | Saitoh et al. |
| 4,814,869 | A | | 3/1989 | Oliver, Jr. |
| 4,943,854 | A | | 7/1990 | Shiota et al. |
| 5,142,367 | A | | 8/1992 | Hong |
| 5,272,527 | A | | 12/1993 | Watanabe |
| 5,289,275 | A | | 2/1994 | Ishii et al. |
| 5,455,561 | A | | 10/1995 | Brown |
| 5,602,585 | A | | 2/1997 | Dickinson et al. |
| 5,666,157 | A | | 9/1997 | Aviv |
| 5,671,009 | A | | 9/1997 | Chun |
| 5,754,225 | A | | 5/1998 | Naganuma |
| 5,761,326 | A | * | 6/1998 | Brady et al. ................. 382/103 |
| 5,875,305 | A | | 2/1999 | Winter et al. |
| 5,880,775 | A | | 3/1999 | Ross |
| 6,031,573 | A | * | 2/2000 | MacCormack et al. 375/240.16 |
| 6,493,022 | B1 | * | 12/2002 | Ho et al. ...................... 348/154 |
| 6,546,120 | B1 | * | 4/2003 | Etoh et al. ................... 382/107 |
| 6,591,006 | B1 | * | 7/2003 | Niemann ...................... 382/162 |
| 6,628,323 | B1 | * | 9/2003 | Wegmann ..................... 348/143 |
| 6,707,486 | B1 | * | 3/2004 | Millet et al. ................. 348/155 |

* cited by examiner

Primary Examiner—Bhavesh M. Mehta
Assistant Examiner—Barry Choobin
(74) Attorney, Agent, or Firm—Peter S. Gilster; Greensfelder, Hemker & Gale, P.C.

(57) ABSTRACT

The present invention involves a system for automatically screening closed circuit television (CCTV) cameras for large and small scale security systems, as used for example in parking garages. The system includes six primary software elements, each of which performs a unique function within the operation of the security system to provide intelligent camera selection for operators, resulting in a marked decrease of operator fatigue in a CCTV system. Real-time image analysis of video data is performed wherein a single pass of a video frame produces a terrain map which contains parameters indicating the content of the video. Based on the parameters of the terrain map, the system is able to make decisions about which camera an operator should view based on the presence and activity of vehicles and pedestrians, furthermore, discriminating vehicle traffic from pedestrian traffic. The system is compatible with existing CCTV (closed circuit television) systems and is comprised of modular elements to facilitate integration and upgrades.

21 Claims, 14 Drawing Sheets

KNOWN ART

SYSTEM FOR AUTOMATED SCREENING OF SECURITY CAMERAS

CROSS-REFERENCE TO RELATED APPLICATIONS

This application is based upon Provisional Patent Application, Ser. No. 60/180,323, entitled "System for Automated Screening of Security Cameras", filed 4 Feb. 2000, the contents of which are incorporated herein by reference in their entirety and continued preservation of which is requested.

BACKGROUND OF THE INVENTION

1. Field of the Invention

The present invention relates to security systems and, more particularly, to an advantageous new system involving methods and apparatus for automated screening of security cameras, as in large-scale security CCTV (Closed Circuit Television) systems.

2. Prior Art

Security systems, as used for example in parking garages, provide one of the few areas where an owner may feel that it is necessary to employ installed security technology to its full capacity. When a security system is installed there may be implicit acknowledgment of the need for reliable dependence on the system and its functioning to full capacity. Its presence implies to the public that they are under the protection of the system. If then there is an event of loss or injury that might have been prevented had the system been functioning properly and to its full capacity, the owner may be confronted with a claim difficult to defend.

Although parking garages provide a valuable benefit and highly desirable or necessary service to the public by offering parking facilities for vehicles of members of the public, they may nevertheless present risk to members of the visiting public. Property crimes which have been committed in parking garages include auto vandalism and auto burglary; crimes against persons which have been committed in parking garages include purse snatching, strong-arm robbery and, occasionally, assault and abduction. Multi-level pay garages with tollbooths may offer crime deterrence because of access control and the requirement to pass a tollbooth upon exit. But even parking garages so equipped may be increasingly subject to risk of auto thefts and auto burglaries when these garages are located adjacent to quick escape routes such as freeway on-ramps or major thoroughfares.

CCTV systems can be an effective security tool when installed and operated properly as part of security systems in such premises where operators of parking garages have a duty to avoid crimes or other losses or injuries which might otherwise occur. Parking garages, in particular, are good candidates for CCTV coverage because persons are more likely to be alone and vulnerable than in the higher traffic areas. For a CCTV system to operate at full capacity, cameras of the system should be monitored at all times by security personnel.

A CCTV system of multiple video cameras in a parking garage conventionally has no auxiliary system to make intelligent decisions about which camera should be viewed on display monitors. But, it is submitted in accordance with the present disclosure, decisions about which camera should be watched, and which to ignore could instead be based on the content of the video, and electronic auxiliary circuits could be employed to provide intelligent decisions about which camera should be viewed on one or more selected display monitors. Furthermore, the intelligent system would be compatible with existing CCTV systems.

Although reference is made herein to garages, garages are only one example of premises at, in, or in connection with, which such premises security systems are employed to avoid crimes, losses, injuries or other undesired occurrences. Merely one example of an undesired occurrence (which may also be referred to an incidence) is unauthorized entry, and examples of unauthorized entry are typified by vehicular and pedestrian movement in an improper direction or through an unauthorized portal, space, lane or path. All such premises, whether commercial, governmental, institutional or private, in which a security systems or security device or apparatus of the invention could be employed, will be referred to herein as secured premises.

Small-Scale Security Systems

A small CCTV system may for example have a few cameras and a display monitor for each camera. A single security operator can have a continuous view of all the monitors, so that the sole operator can assess unusual events in a few seconds while watching the monitors, at least while carefully observing the monitors. Yet, even in a small system, it is difficult or impossible for one such person to watch the same scene or scenes continuously. After a few minutes of the same view, what may be termed attention fatigue sets in. After hours on duty, the monitors become to the security person just part of the background clutter. Thus, operator concentration and ability to discern undesired occurrences, which may otherwise be evident from the monitor displays, is reduced or lost.

Large-Scale Security Systems

In a large CCTV system having hundreds of cameras, the fatigue factor is extreme for security personnel who must observe a correspondingly large number of display monitors. Conventional CCTV control systems have been proposed which have capability to sequence cameras to monitors in rotation. This allows operators to view every camera in the system periodically with a reasonable number of monitors.

For example, in a large, sophisticated metropolitan system having about 300 CCTV cameras in garages, 13 security personnel might be needed to view every camera monitor once per minute, even when using a known sequencing system capable of switching four monitors per operator each 10 seconds. In such a system, presenting one view per minute on a display monitors will not allow operators to detect quickly occurring events such as purse snatching. In order to operate 13 security positions 24 hours per day, adequate staffing requires about 65 persons on staff. Even if resultant high costs of such staffing are sustainable, security personnel cannot practically be expected to maintain a satisfactorily high level of attention for adequate incidence discernment, because such personnel are presented on the display monitors with some 11,520 individual scenes to evaluate during each 8-hour shift.

Another known method of handling large numbers of CCTV cameras is to create a "wall of monitors." Using, in a CCTV system of approximately 300 monitors, each of 19-inch type, stacked from a point beginning 3 feet above floor level and extending to 9 feet above floor level, a reach of approximately 137 feet of linear wall space would be required by the wall of monitors. Or, if arranged peripherally along the walls of a room, such monitors would completely line a room of dimensions 14 feet by 60 feet. If operators were stationed 20 feet apart along the wall (or walls), all camera views could be viewed on the display monitors by at least eight security personnel. However, if such a wall of monitors 137 feet in length were to be employed, it is improbable that any crime event or other incident would be seen.

FIG. 1 depicts a human figure, being that of a male 6 ft. in height, standing at one end of a row of 76 equipment racks holding 304 monitors, in order to simulate the appearance and relative scale of a so-called wall of monitors which would result from this large number of CCTV display monitors. Although the human figure is not drawn to scale, the operating viewing situation or requirements for such a wall of monitors can easily be visualized, and will readily be realized as being impractical for a large quantity of monitors. Smaller display monitors require less space, but security personnel must then view the smaller display monitors from a reduced distance, in order to be able to discern each scene.

It is postulated that the number of security personnel operators for watching display monitors of a large CCTV-equipped security system can be reduced by using known video motion detectors in combination with electronics for controlling CCTV switching. However, at some level of activity in garages of such a large security system using known video motion detection techniques, cameras without some detectible motion in the video are omitted from a switching sequence. While detection by a video motion detector of the movement of even a single car in a camera view would cause that camera to be included in the sequence, that same car driven by a person looking for a parking spot may pass several cameras, causing the view from each in turn to be presented on an operator's call-up screen.

Adding motion detection to every camera, and custom software to limit cameras in the sequence to those with motion could reduce the required staff watching cameras significantly. Although no precise data is known, it is estimated that operator attention requirements, which may be termed operator load, would decrease by a factor of two if only the cameras with motion were presented to operators of the system. Decreasing operator load by one-half would nevertheless require six operators on duty during the day, that is, as one shift, which would requiring a total operator staff of about 30 persons. Even if the security budget will allow for payment of 30 salaries for operating personnel, the monitoring task would drive these operators to extreme attention fatigue within any given shift.

A previously proposed CCTV system intended to be used with airport parking garages was premised on providing video motion detection on each video camera and using software to control electronic selection of only cameras providing video output with motion so as to be viewed by security operators. As the number of cameras in the proposed system was postulated to grow, the weakness of simple motion detection could become apparent. Commercially available motion detectors for such a system are found to be unable to distinguish a person from a vehicle. Thus, for example, every car passing by a camera could trigger a motion detector of the system. As vehicles would drive down aisles they would pass several cameras, and this would result in the presentation on display monitors of multiple views of the same vehicle. About six operators would be required to be on duty during the day, and the repetitive presentation of views caused by movement of a single vehicle past multiple cameras would cause extreme boredom and resulting lack of attention.

One known method of monitoring a scene is provided in Ross, U.S. Pat. No. 5,880,775, where pixels of individual frames are compared to generate a difference value, which value when exceeds a predetermined threshold activates a VCR (Video Cassette Recorder) for recording. Another method is provided in Winter et al., U.S. Pat. No. 5,875,305, where video data is analyzed to detect a predetermined characteristic based on features of a target such as size, speed, shape, or chrominance changes and subsequent video compression storage. Other methods of motion detection, fire detection, and other event-based detection with subsequent system action for security purposes are numerous and well known in the field. However, the known art does not fully address the need for intelligent camera selection based on a plurality of inputs for decreasing operator load and fatigue. Additionally, the known art does not control CCTV switching for operator viewing. Shiota et al., U.S. Pat. No. 4,943,854, provides a multi-video recorder that allows selection of a signal from a plurality of cameras, however, without any image analysis and based primarily on motion detection sensors. Furthermore, the known art detection methods do not employ the unique image analysis techniques of the present invention for intelligent camera selection, which are more fully described herein below.

Accordingly, a need exists in the art for image analysis techniques which are much more simplified. Simplified image analysis techniques will further allow for real-time image analysis and a more robust security camera screening system.

OBJECTS AND SUMMARY OF THE INVENTION

Among the several objects, features and advantages of the invention may be noted the provision of a novel and advantageous security system using novel, highly advantageous methods and apparatus for automated screening of security cameras described, and specifically such methods and apparatus which:

are more cost effective than any comparable previous CCTV system;

are capable of use in conjunction with large conventional CCTV systems operating at full capacity;

achieve marked decrease of operator fatigue in a CCTV system;

improve security in parking areas and garages and other premises having vehicular and/or pedestrian traffic within the premises;

function as a so-called intelligent electronic system with capability to direct video camera output to one or more video display monitors only when there is something of logical relevance for viewing by an operator;

are effective to cause CCTV monitor views to be presented to the operator when video camera view content is of sufficient relevance as to require human level analysis, through use of intelligent electronic selection of views for each of the multiple CCTV display monitors;

provide a solution to the above-referenced foregoing problems of operator use of display monitors for monitoring the view from CCTV cameras of a security system;

achieve in a CCTV system a functional operating advantage in that observation by operators of display monitors of the system is much less boring or fatiguing than hitherto characteristic of CCTV systems;

induce an increase in operator attention span and incidence discernment;

achieve a high degree of premises security at relatively low cost; and achieve in CCTV security systems a high level of reliable dependence on the system and its functioning to its capacities to an extent not hitherto experienced.

In accordance with one aspect of the present invention, intelligent camera selection, which is to say, automatic electronically-controlled selection for presentation on a display monitor in accordance with an electronic logic protocol, is carried out by an integrated security system having a plurality of CCTV cameras covering another plurality of access controlled areas. When there is an event incident or occurrence, for example, a fallen person, the camera viewing the incident is automatically selected, i.e., its video output is selected to provide a corresponding display, or call-up, of that camera's view on the display monitor of an operator. The selection and call-up of the camera view can also include an audio notification of same. If there is no event occurrence to assess, the display monitor is blank. Because such automatic camera call-up functions in response to an event occurrence, operator load is dependent on event activity, without regard to the number of cameras in the system.

A primary aim, feature and advantage of the present invention is that a security system in accordance with the present teachings is capable of automatically carrying out decisions about which video camera should be watched, and which to ignore, based on video content of each such camera, as by use of video motion detectors, in combination with other features of the presently inventive electronic subsystem, constituting a processor-controlled selection and control system ("PCS system"), which serves as a key part of the overall security system, for controlling selection of the CCTV cameras. The PCS system is implemented in order to enable automatic decisions to be made about which camera view should be displayed on a display monitor of the CCTV system, and thus watched by supervisory personnel, and which video camera views are ignored, all based on processor-implemented interpretation of the content of the video available from each of at least a group of video cameras within the CCTV system.

Included as a part of the PCS system are novel image analysis techniques which allow the system to make decisions about which camera an operator should view based on the presence and activity of vehicles and pedestrians. Events are associated with both vehicles and pedestrians and include, but are not limited to, single pedestrian, multiple pedestrians, fast pedestrian, fallen pedestrian, lurking pedestrian, erratic pedestrian, converging pedestrians, single vehicle, multiple vehicles, fast vehicles, and sudden stop vehicle.

The image analysis techniques are also able to discriminate vehicular traffic from pedestrian traffic by tracking background images and segmenting moving targets. Vehicles are distinguished from pedestrians based on multiple factors, including the characteristic movement of pedestrians compared with vehicles, i.e. pedestrians move their arms and legs when moving and vehicles maintain the same shape when moving. Other factors include the aspect ratio and smoothness, for example, pedestrians are taller than vehicles and vehicles are smoother than pedestrians.

The primary image analysis techniques of the present invention are based on an analysis of a Terrain Map. Generally, a Terrain Map is generated from a single pass of a video frame, resulting in characteristic information regarding the content of the video. Terrain Map creates a file with the characteristic information based on each of the 2×2 kernels of pixels in an input buffer, which contains six bytes of data describing the relationship of each of sixteen pixels in a 4×4 kernel surrounding the 2×2 kernel.

The informational content of the video generated by the Terrain Map is the basis for all image analysis techniques of the present invention and results in the generation of several parameters for further image analysis. The parameters include: (1) Average Altitude; (2) Degree of Slope; (3) Direction of Slope; (4) Horizontal Smoothness; (5) Vertical Smoothness; (6) Jaggyness; (7) Color Degree; and (8) Color Direction.

Average Altitude

The parameter 'Average Altitude' calculates an average value of four pixels in the center 2×2 kernel.

Degree of Slope

The 'Degree of Slope' parameter calculates the absolute difference, in percent, between the highest average value and the lowest average value calculated by Average Altitude.

Direction of Slope

The parameter 'Direction of Slope' calculates the direction of the slope based on the highest and lowest average value calculated by Average Altitude.

Horizontal Smoothness

'Horizontal Smoothness' calculates the consistency of change in horizontal direction from the lowest pixel to the highest.

Vertical Smoothness

Similar to Horizontal Smoothness, 'Vertical Smoothness' calculates the consistency of change in vertical direction from the lowest pixel to the highest.

Jaggyness

The 'Jaggyness' parameter measures the offset in pixels between odd and even fields for a given target segmented from a frame of video. The offset is then used to determine how fast a target is moving and the direction of movement of the target. Generally, Jaggyness is a measure of the amount of interlace distortion caused by motion between odd and even fields of the frame of video.

Color Degree

'Color Degree' generally measures how far the color is from gray scale. Zero is equivalent to completely white or completely black, and 255 is equivalent to one color completely.

Color Direction

'Color Direction' calculates a color space similar to hue based on two-dimensional, (B-R and G-R), color analyses. The two-dimensional analysis significantly reduces the number of floating point calculations over that of hue calculations or three-dimensional RGB calculations, and is a factor in achieving real-time calculation. Generally, Color Direction is a measure of the tint of the color.

An additional image analysis function, namely 'Maintain Background' segregates background from moving targets by averaging portions of frames that contain no moving targets. The moving target is further analyzed to discriminate vehicular (or other) traffic from pedestrian traffic.

The PCS system is comprised of six primary software components, all built using Microsoft and Intel tools, including a combination of Visual Basic and C++ software programming languages. The six components include the following:

(1) Analysis Worker(s);

(2) Video Supervisor(s);

(3) Video Worker(s);

(4) Node Manager(s);
(5) Set Rules GUI (Graphical User Interface); and
(6) Arbitrator.

Video input from security cameras is first sent to a Video Worker, which captures frames of video (frame grabber) and has various properties, methods, and events that facilitate communication with the Video Supervisor. There is one Video Supervisor for each frame grabber. The Analysis Workers perform image analysis on the video frames captured by the Video Worker and subsequently report activity to the Video Supervisor. Similarly, the Analysis Workers have various properties, methods, and events that facilitate communication with the Video Supervisor. The Video Supervisor keeps track of when frames are available from the Video Worker and when the Analysis Worker is prepared for another frame, and directs data flow accordingly. The Video Supervisor then sends data to the Node Manager, which in turn concentrates the communications from multiple Video Supervisors to the Arbitrator, thereby managing and decreasing the overall data flow to the Arbitrator.

The Set Rules GUI permits changing the system rules about what video is presented to which monitor, for example, changing dwell time for scenes with multiple people or changing the operator console to receive video from a group of cameras. The Arbitrator then receives data from Node Managers about what activities are present in the system, and receives rules from the Set Rules GUI about what activity should be presented to which monitor, and correspondingly arbitrates conflicts between available monitors and pending activity. The system cameras can also be controlled by the operator with a PTZ (Pan-Tilt-Zoom) control. The PCS system also includes quad splitters, which receive analog video from a central CCTV switch and provide multiple video scenes on one operator console.

The PCS system interfaces with the existing conventional CCTV system through an interface between the Arbitrator and the port server of the CCTV system. Data flow from the Arbitrator to the port server is via a serial link, and data flow from the port server to the Arbitrator is via interprocess DCOM (Distributed Component Object Model), a protocol that enables software components to communicate directly over a network. Interprocess data from the PCS system to the port server of the CCTV system includes the camera number to next be selected, output destination of next camera selection, commands to set up route from camera to monitor, and a message string which allows for future extensions without revising the interface. Interprocess data from the port server of the CCTV system to the PCS system includes the camera number that the operator selected for viewing on another monitor, camera number that the operator selected for pan, tilt, or zoom (PTZ), and a message string which allows for future extensions without revising the interface.

Data flow between the security cameras and the Video Worker, as well as between the quad splitters and the user interface is analog video. Data flow between PCS system components is similarly interprocess DCOM, with the flow from the Video Worker to the Video Supervisor and the flow from the rules database to the Arbitrator being intraprocess COM (COM), a software architecture that allows applications to be built from binary software components.

In a known embodiment of the present invention, there exist three Node Managers, each receiving data from a Video Supervisor, which in turn directs data flow between one Video Worker and four Analysis Workers. There is one Set Rules GUI, and there can exist only one Arbitrator per system.

Therefore, it will be understood that in accordance with the invention there is provided a novel and advantageous security system, which may be termed a composite security system, in that it comprises both PCS and CCTV subsystems functioning synergistically.

It is also within the purview of the invention to provide, as a system in and to itself, the features of the present processor-controlled selection and control system ("PCS system"), which can be incorporated into, and thus used with, existing CCTV systems and thus becomes an auxiliary system within such a CCTV system.

Additional objects, novel features, and advantages of the present invention will become more apparent to those skilled in the art and are exemplified with more particularity in the detailed description that follows.

BRIEF DESCRIPTION OF THE DRAWINGS

The above mentioned and other features and objects of the invention, and the manner of attaining them, will become more apparent and the invention itself will be better understood by reference to the following description of an embodiment of the invention taken in conjunction with the accompanying drawings, wherein.

Figure 1:
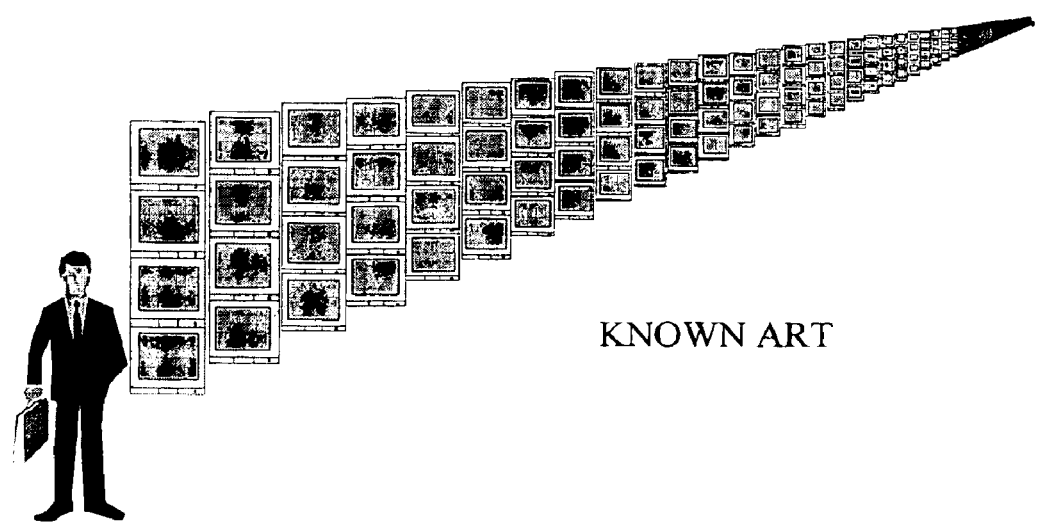
FIG. 1 is perspective view of a so-called wall of CCTV display monitors together with the representation of a human figure positioned at one end of the "wall," in accordance with the known art. The drawing is thus labeled "Known Art." The human figure is not drawn to scale.

Corresponding reference characters indicate corresponding parts throughout the several views. Although the drawings represent embodiments of the present invention, the drawings are not necessarily to scale and certain features may be exaggerated in order to better illustrate and explain the present invention.

The patent or application file contains at least one drawing executed in color. Copies of this patent or patent application publication with color drawing(s) will be provided by the Office upon request and payment of the necessary fee.

DETAILED DESCRIPTION OF THE PRESENT INVENTION

Figure 2:
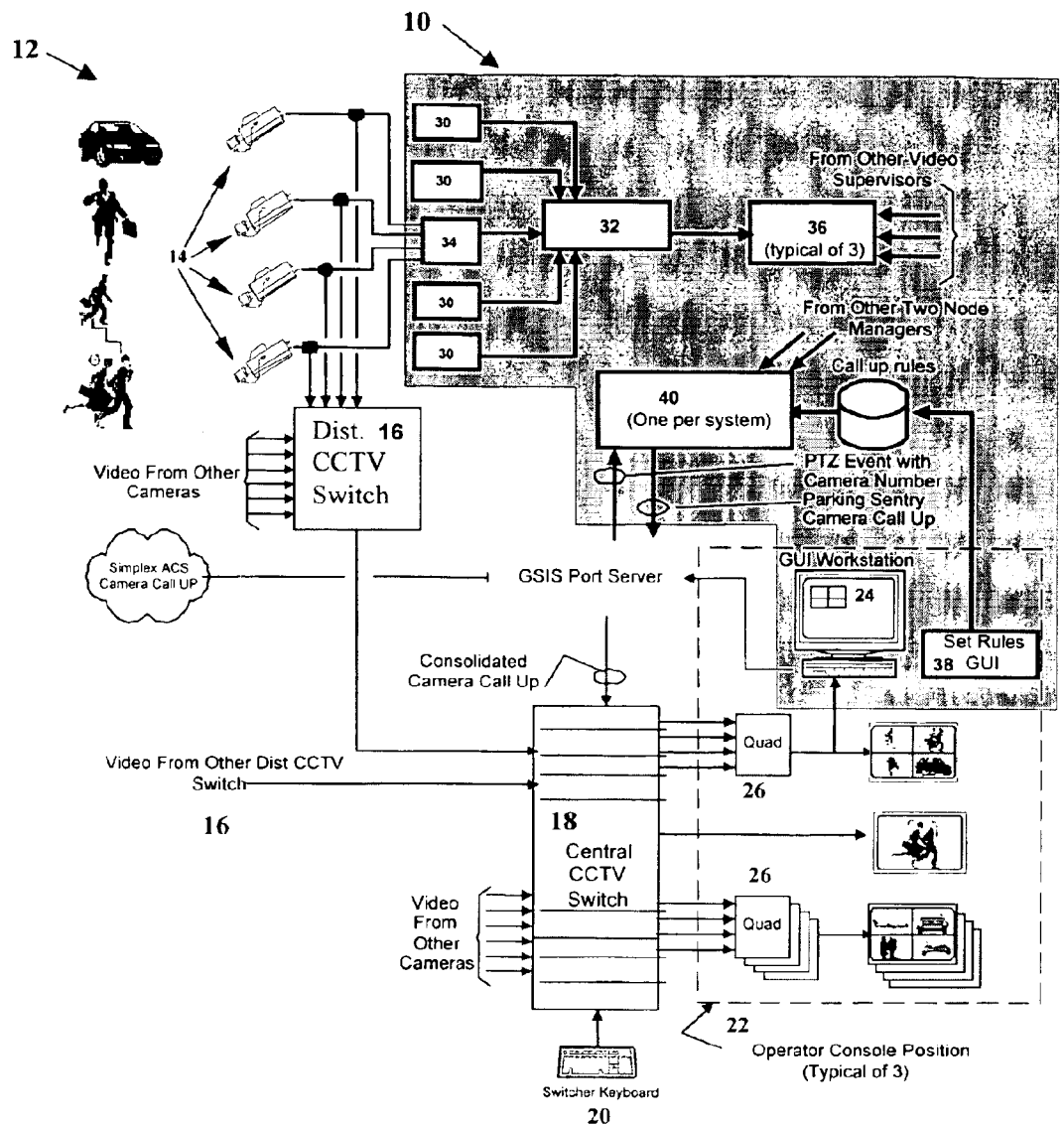
FIG. 2 is a block diagram of a security system in accordance with and embodying the present invention, having CCTV subsystem components and electronics subsystem features including software-driven components, by which video outputs from video cameras of system are automatically selectively made available to display monitors of the CCTV system, where the camera views may be viewed by security personnel who observe the display monitors, by video selectively supplied to one video display console or more such consoles. Only a typical unit of possible multiple operator console positions is shown in this block diagram.

Referring to the drawings, and in particular to FIG. 2, software components of processor-controlled selection and control system (PCS) 10 are shown in boxes in the upper right area, as contained within the broken dash-and-dot border. Other components in the figure reflect the block diagram of CCTV subsystem 12 used in connection with electronics features including the software-driven components in accordance with the inventive system configuration. The software-driven components of the electronics subsystem cause video outputs from video cameras of the CCTV subsystem to be automatically and selectively made available to display monitors of the CCTV system, where the camera views may be viewed by security personnel who observe the display monitors, by video selectively supplied to one video display console for an operator, or to more such consoles.

Existing CCTV System

It will be assumed for purposes of explaining the new system that it includes, as in the example given above, hundreds of CCTV cameras located within a parking garage or series of such garages or a garage complex. Each of CCTV garage cameras 14 is connected directly to one of three CCTV switches (two distributed CCTV switches 16, and one central CCTV switch 18). Distributed CCTV switches 16 forward video from CCTV garage cameras 14 to central CCTV switch 18. Central CCTV switch 18 is configured to be controlled by central switch keyboard 20 in accordance with known techniques, and directs video from CCTV garage cameras 14 to operator consoles 22. Distributed CCTV switches 16 and central CCTV switch 18 receive analog video from CCTV garage cameras 14 and subsequently send analog video to operator consoles 22. Distributed switches 16 and central switch 18 are Commercial-Off-The-Shelf (COTS) equipment. It will be understood that there may be other such CCTV switches of the system.

Various possible types of video input can be provided to central CCTV switch 18. Such input may include, for example, video from distributed CCTV switch 16, other CCTV switches, and video from other CCTV garage cameras 14.

Central CCTV switch 18 is configured to be controlled by central switch keyboard 20 in accordance with known techniques. Central CCTV switch 18 directs video from CCTV garage cameras 14 to operator consoles 22. Operator consoles 22 are comprised of GUI workstations 24 which may be provided with quad video splitters 26. Quad video splitters 26 are typical of such splitters which split video images into a 2-by-2 format presenting four video scenes on a single display monitor. In the present illustrative system embodiment, two of operator consoles 22 are equipped with quad video splitters 26 intended for monitoring garage cameras and selecting camera views to be transferred to the single display monitor.

The analog video output from quad video splitter 26 is shown interconnected with GUI workstation 24 for illustrating the manner in which camera views can be made available for the purpose of setting up and/or changing operation of the system.

Processor-Controlled Selection and Control System (PCS)

Six software modules of PCS system 10 are identified in FIG. 2 and include: Analysis Workers 30, Video Supervisors 32, Video Workers 34, Node Managers 36, Set Rules GUI (Graphical User Interface) 38, and Arbitrator 40. The functions of each of the software modules and their interactions are described in the following:

Analysis Workers

Analysis Workers 30 are ActiveX® EXE modules that are responsible for image analysis. ActiveX® controls are among the many types of components that use COM technologies to provide interoperability with other types of COM components and services. Analysis Worker 30 analyze the video from one camera and report activity to associated Video Supervisor 32. New frames are obtained from shared memory as directed by Video Supervisor 32. Analysis Workers 30 are VB (Visual Basic) shells responsible for communicating with Video Supervisors 32 and making upper level decisions about video activity. Low level calls to the image processing functions are performed from a DLL (Dynamic Link Library), a library of executable functions or data. All Analysis Workers 30 in PCS 10 share the DLL, and all calls to the DLL are made by Analysis Workers 30.

Analysis Workers 30 also act as servers to the Video Supervisor 32. All image data manipulation is performed in the C++ functions of the DLL. Within the DLL there exist functions that support the image analysis methods of the present invention as described in greater detail below.

Image Analysis Dynamic Link Library (DLL)

All functions that manipulate image data are in a high level DLL that enables the rapid creation of image analysis programs from Visual Basic with minimal effort expended on image data. The DLL processes image data and returns symbolic data to a Visual Basic calling program, namely, an Analysis Worker executable. In the preferred embodiment of the present invention, the DLL functions exist in three source code modules:

1). Utilities Function (.Cpp)—Contains all utility functions such as read from files and allocate/free memory.

2). Image Processing Function (.Cpp)—Contains image processing functions such as Maintain Background.

3). Image Analyses Function (.Cpp)—Contains image analysis functions that require prior segmentation.

Arrays are employed in the DLL of the present invention for tracking targets or objects within the video content. One array includes data regarding the target (Target Data), and another array includes data regarding the history of the target (Target History). As symbolic data is collected for the targets, the data is stored in the elements of two dimensional arrays of structures. One dimension is for the numbers of frames to track, and the other dimension is for the number of targets in each frame, up to a global variable maximum. For example, an element "Name [3] [9]" in the Target History array would hold data for the ninth object of the frame data stored in row three.

Symbolic data required to make a decision about whether the target is a car or a person is stored in the Target Data array. Accordingly, the Target Data array holds a number of rows, generally represented by a global variable, required to make the decision about the nature of the target. The preferred embodiment of the present invention utilizes ten rows in the Target Data array.

Similarly, symbolic data required to interpret the behavior of a target over a period of time is stored in the Target History array. The Target History array keeps track of the target for several seconds and also employs a number of rows represented by a global variable. The preferred embodiment of the present invention utilizes one hundred rows in the Target History array.

Each of the Target Data and Target History Arrays have the same number of columns to track the same number of targets in each frame as defined by the global variable for the maximum number of targets. The preferred embodiment of the present invention utilizes sixty four columns to track the number of targets.

The first four elements of the Target Data and Target History arrays contain the same elements, and the Target History array is longer than the Target Data array. For example, ten targets tracked in ten frames of the Target Data array are the same targets tracked in the ten most recent frames of the Target History array. As a result, data in the ten rows of the Target Data array can always be mapped to the ten most recent rows in the Target History array.

The first dimension of both the Target Data and Target History arrays is used as a ring, such that a variable for the current data row will point the row of array Target Data to be used for the next frame that is analyzed. The current data row variable is incremented for each frame analyzed and when the global variable for the maximum number of rows is reached, the current data row variable is set to 1.

Similarly, a variable for the current history row will point the row of array Target History to be used for the next frame that is analyzed, and the current history row variable is incremented for each frame analyzed. When the global variable for the maximum number of history rows is reached, the current history row variable is set to 1.

As targets are counted and labeled in each frame, the elements of the Target History array are placed in the corresponding element. For example, column 9 of the Target History array will hold data about the target with all pixels set to 9 by a label target function.

A further image analysis function is that of Registration Marks, which provides an indication of camera movement. The Registration Marks function scans through a Terrain Map for corners with high degrees of slope and different directions of slope than corners in adjacent Terrain Map structures.

The following is a more detailed description of further functions in the image analysis DLL that manipulate image data:

Allocate Array Memory: A function to allocate memory for the Target Data and Target History arrays for the sizes specified in the global variables for the maximum number of targets, Target Data rows, and Target History rows. Recall that the number of columns is always the same for both arrays but the number of rows may be different. The number of columns is determined by a constant in the DLL and is placed in the global variable for the maximum number of targets.

Allocate a Buffer: A function to encapsulate all code required to allocate a specified size buffer using a specified buffer type.

Allocate a Buffer for Color Terrain Map: A function to encapsulate the code required to allocate a color Terrain Map buffer. A raw buffer is allocated as per arguments which map rows and columns.

Allocate a List for Registration Marks: A function to allocate memory and return a pointer to a two dimensional array for the Registration Mark function. The type of structure used is determined by a global variable for the number of bits per pixel, the number of rows is determined by a global variable for the number of marks, and the number of columns is determined by a global variable for the number of elements per mark.

Allocate a Buffer for Mono Terrain Map: Similar to the function for allocating a buffer for the Color Terrain Map, a function to encapsulate the code required to allocate a buffer for a monochrome Terrain map is utilized.

Target Analysis: A general function for target analysis which outputs symbolic data to the elements of the Target History array as specified by various arguments. The arguments according to the preferred embodiment of the present invention include, but are not limited to, whether the target: has a head, is tall, has arms, has legs, is traveling with speed, is traveling in a particular direction, has wheels, is a pedestrian or a vehicle, and when the target last moved.

To determine whether the target has a head, the percent fill of the top 1/5 of a bounding rectangle is compared to the percent fill of the second from top 1/5 of the bounding rectangle. If the values are the same, the target has no head. If the top is less than 25% of the second, then the target has a head.

To determine if the target is tall, an aspect ratio is calculated based on the height and width of the target. If the aspect ratio is 3 times as high as wide then the target is tall.

Figure 3:
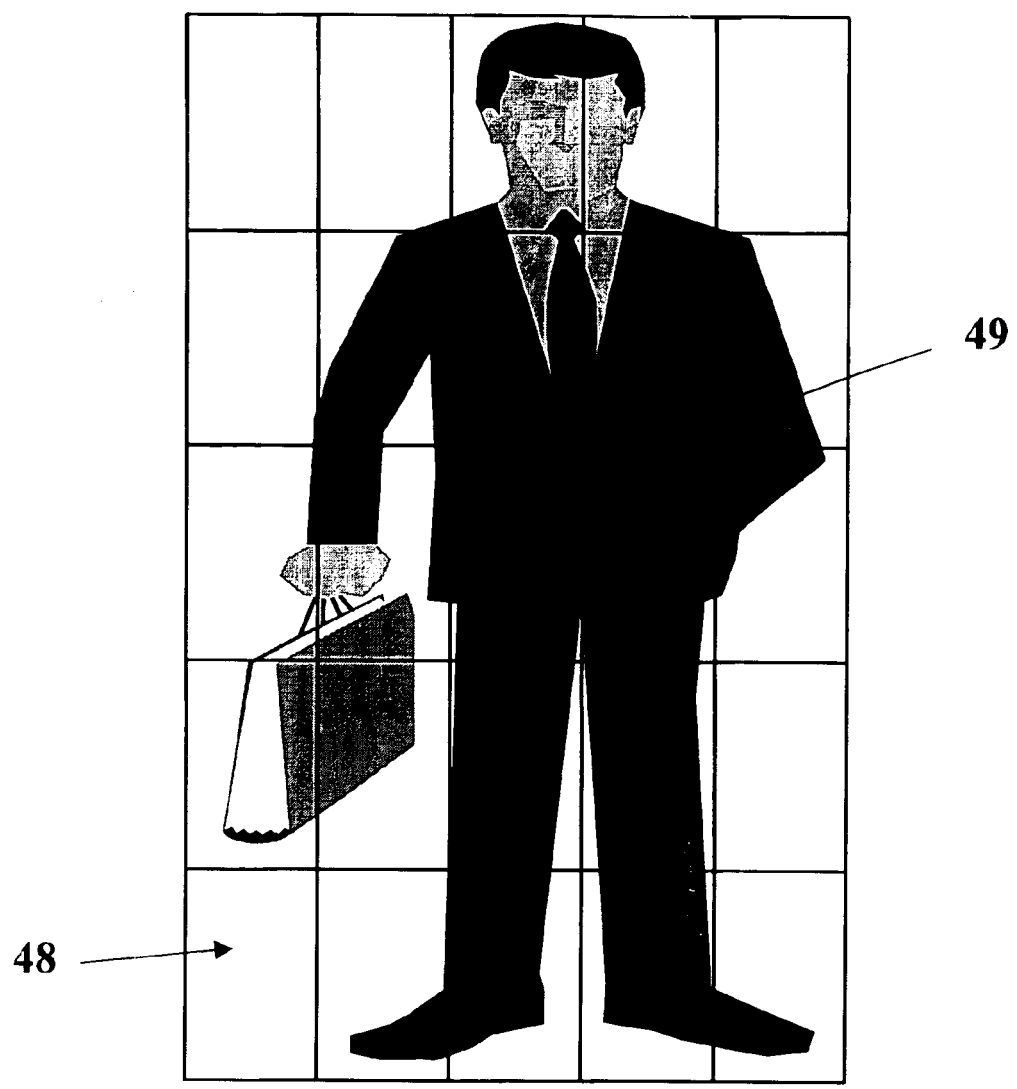
FIG. 3 is a view of image areas used for image analysis according to the present invention.

Referring to FIG. 3, a determination as to whether the target has arms involves a series of bounding rectangles 48 over the target 49. The second and third rows of five areas (from top to bottom) of a bounding rectangle is compared to the second and third rows of the bounding rectangle from the previous frame of the target. The level of pixel change from the current frame to the previous frame determines whether the target has arms.

Similarly, a determination as to whether the target has legs involves a comparison of the lower 2/5 of the current bounding rectangle with the lower 2/5 of the bounding rectangle from the previous frame of the target.

Speed is determined by measuring velocity in widths per second and heights per second from the data in the target history array.

Direction of the target is determined by simply comparing the change is pixels between the last frame that the target was recognized and the current frame.

A target is classified as a pedestrian or a vehicle based on multiple factors, including the characteristic movement of pedestrians compared with vehicles, i.e. pedestrians move their arms and legs when moving and vehicles maintain the same shape when moving. Other factors include the aspect ratio and smoothness, for example, pedestrians are taller than vehicles and vehicles are smoother than pedestrians. To determine when a target has last moved, a threshold value is used to compare the movement of the target against. If the target has moved more than the threshold since the last frame, then a global variable for the last movement is set to zero. If the target has not moved then the global variable is incremented.

A further function exists in the preferred embodiment of the present invention to compare two targets to get a probability of whether the targets in different frames are the same object. The arguments specify the reference and test targets and support a further function that compares targets in adjacent frames to track individual targets. Moreover, the arguments can point to targets in the same frame or to targets an indefinite number of frames apart. The argument returns a percent probability of a match wherein a score of 100% corresponds to a pixel by pixel exact match.

An additional function that compares mono Terrain Maps is also implemented to perform segmentation as required by the comparison of two Terrain Maps. Segmentation is required to distinguish moving objects from the background. Arguments which determine the limit on the difference between the altitudes before a 2×2 kernel is segmented, independent of the likeness of other terrain features, and how much different other terrain features must be to segment a 2×2 kernel, even if the background and test altitudes are the same, are also employed. The absolute values of the differences of the individual terrain features are summed and compared to the argument which determines how much different the terrain features must be to segment. If five values in a test map are sufficiently different from five values in a background buffer, then the associated pixel in the result buffer is set to 255, indicating that the 2×2 kernel is to be segmented.

Similarly, a function to compare color Terrain Maps is also contemplated by the present invention. The argument performs segmentation by the comparison of two Terrain Maps similar to the argument that compares mono Terrain Maps as described above and further includes a color direction. At low color degrees, the direction of the color is given zero weight.

Additional functions are used to compensate for camera shaking. Offsets in pixels are determined to indicate the number of Terrain Map structures that the frames must be offset from each other to realign the backgrounds.

A function which confirms Registration Marks scans through the Terrain Map looking for corners that were found by the function that locates Registration Marks. Generally, the Registration Marks are located on a background image and confirmed on a test image. If the camera has not moved, the marks will be in the same place. If some of the marks are covered by targets in the test image, others will still be visible if a sufficient number are generated.

If the camera has moved, the function that confirms registration marks will search for the new location of the corners in a spiral pattern outward from the original condition until the corner is found or a maximum threshold is reached. If one or more corners can be located with the same offsets, then those offsets are placed in the global variables for x and y offsets, and the number of corners found at those offsets are returned. If none of the corners in the list can be located, the function returns zero. The sign of the global variables for x and y offset apply to the direction the current buffer must be adjusted to align with the background buffer after the camera shake. If the x and y offsets are both −3, for example, then the current buffer must be adjusted down and to the left by three pixels for the remainder of the images to align.

A further array contains a list of Registration Marks and is a two dimensional array of structures, with one row for each registration mark and one column for each Terrain Map structure in the mark. Consequently, global variables for the number of marks and the elements per mark are employed. The number of marks determines the number of registration marks to confirm in the Terrain Map and is the square of an integer. The elements per mark determines the number of adjacent Terrain Map structures to define a registration mark. Furthermore, the size of the Terrain Map is determined by global size variables.

Yet another function interrogates features and provides a means for the calling process to find out if a particular feature is supported before calling it. This function is a switch statement where each case is a supported feature. The switch statement is filled out as the program is developed to recognize such feature names such as:

"HasArms"
"HasLegs"
"HasHead"
"IsTall"
"CheckSpeed"
"CheckDirection"
"RemoveGlare"
"RemoveShadow"
"StopShaking"
"CheckSmoothness"
"ClassificationMatching"
"TemplateMatching"

Targets are labeled using a function that scans through an image that has been converted to binary (highlighted) with objects ON and the background OFF. Connected pixels are labeled in a result buffer with all of the connected pixels in the first target set to one and the second target to 2, and similarly up to 255 targets. Targets having less than a minimum size pixel or more than a maximum size pixel, or less than a minimum height or less than a minimum width are erased. The target labeling function will eliminate noise but will not connect targets.

Figure 4:
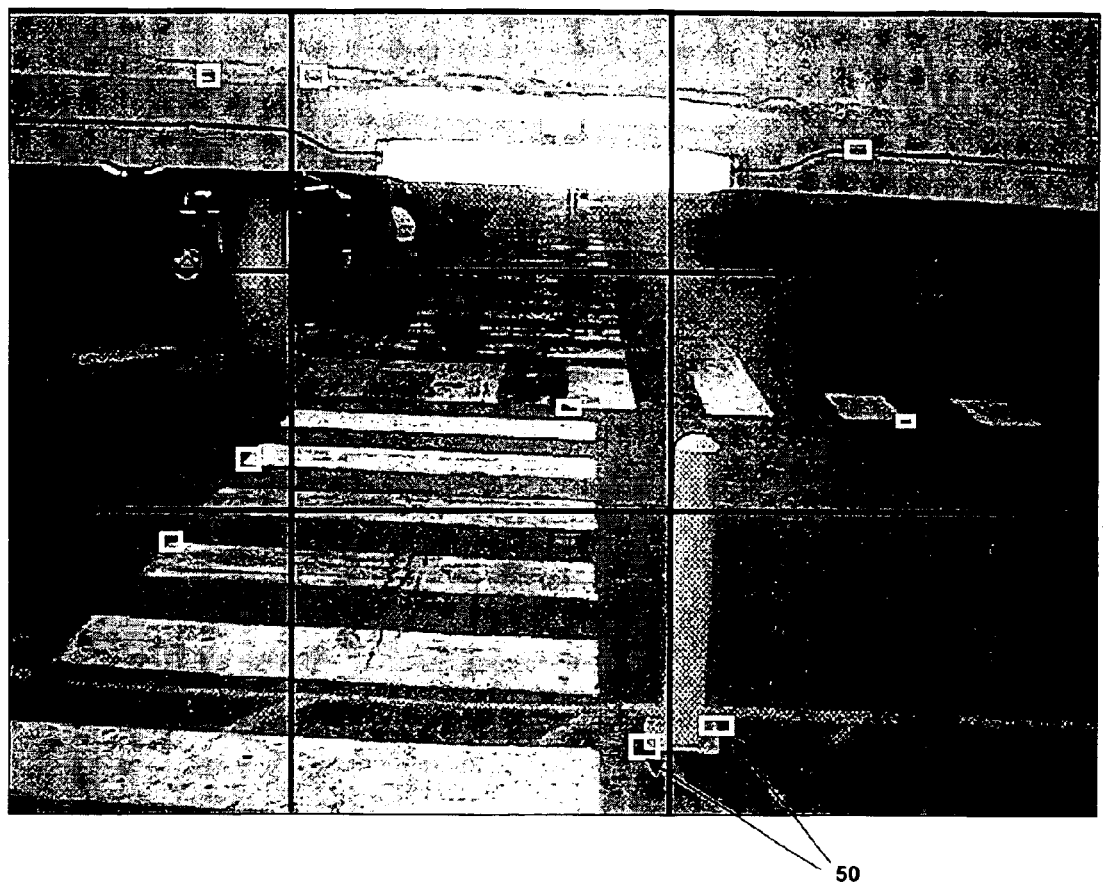
FIG. 4 is a view depicting registration marks highlighted in a three-by-three grid according to the present invention.

Registration Marks are located using a function that scans through the Terrain Map of the argument looking for corners as indicated by high degrees of slope with different directions of slope in adjacent Terrain Map structures. The number of elements per mark is a square of an integer and as low as possible to find clear corners. Each mark will consist of a square area of the map, for example, a 3-by-3 for the number of marks argument is equal to nine marks. The threshold for the degree of slope and difference in direction of slope is determined by test and hard coded. As shown in FIG. 4, nine Registration Marks 50 are highlighted in a 3-by-3 grid.

For each Registration Mark 50 found by the location function, the values of the corresponding Terrain Map structures are copied to the elements of the array having a list of Registration Marks, and the associated row and column of the Terrain Map are included in the Registration Mark structure.

Identification of target matches with another frame is conducted with a function that controls the looping through the elements of the two rows of the Target Data array. The function looks for matches with the another frame which is assumed to be the last frame, however, another frame could be any earlier frame. Every target in the newer frame is tested for a match with every target in the older frame, using a two-stage comparison. First, a fast comparison is performed to see if the two targets are similar, and if they are, then the function that compares targets is called. A score is then generated and compared to an argument for the required score to indicate whether a match has been found.

A function which maintains the background is provided that filters background image data from the targets of interest. Generally, the function segregates background from moving targets by averaging portions of frames that contain no moving targets.

Figure 5:
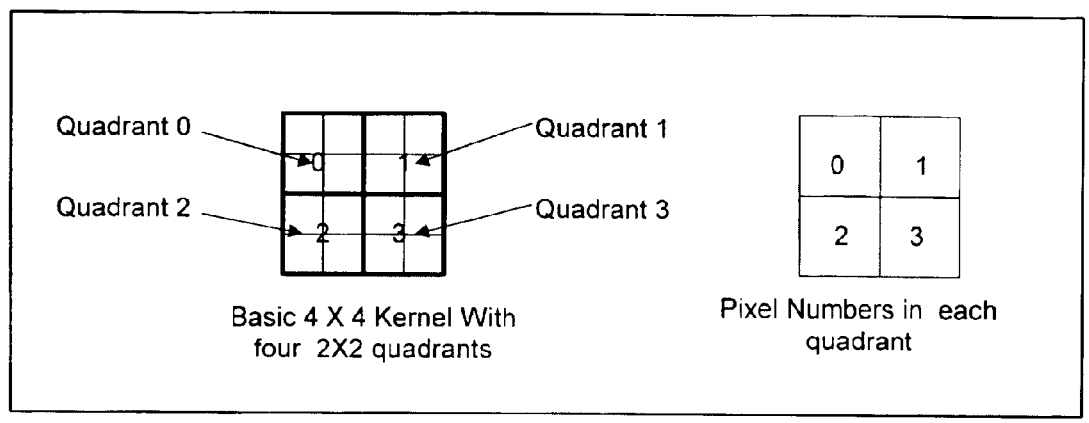
FIG. 5 is a view of the basic four-by-four kernel with four two-by-two quadrants and the pixel numbers in each quadrant for making a Terrain Map in accordance with the present invention.

As previously set forth, a function to create a mono Terrain Map is also provided. For each 2×2 kernel of pixels in the input buffer, a Terrain Map is filled out with six bytes of data describing the relationships of the 16 pixels in a 4×4 kernel surrounding the 2×2 kernel. As shown in FIG. 5, quadrants are numbered like pixels in each quadrant. The following are elements used in the MakeTerrainMapMono function:

Average Altitude: Average value of the four pixels in the center 2×2 kernel.

Degree of Slope: Absolute difference, in percent, between the highest average value of the four 2×2 quadrants in the 4×4 kernel and the lowest average value quadrant.

Direction of Slope: Direction of the slope between the highest and lowest quadrants used to define the Degree of Slope. Direction of slope is determined by the rules according to FIG. 6. The values are one third of the degrees to allow 120 to fit into four bits where 360 would require eight bits.

Horizontal Smoothness: A measure of how consistently the pixels change in the horizontal direction from the lowest pixel to the highest.

Vertical Smoothness: A measure of how consistently the pixels change in the vertical direction from the lowest pixel to the highest.

Jaggyness: A measure of how much interlace distortion has been caused by motion between the odd and even fields of the frame.

The resulting Terrain Map is stored in a single plane of structures in row-column order. The structure type is an array for the terrain data and has one element for each terrain feature. A buffer for the Terrain Map buffer contains SizeX/2*SizeY/2 structure, and the size of the buffer is SizeX/2*SizeY/2*size of Terrain Data. The first element of the Terrain Map buffer will contain data for the first two pixels in each of the first two rows of the input buffer, which is the first 2×2 kernel found. The Terrain Map buffer is raw, and accordingly there is no header to provide the size so the function assumes that the global variables SizeX and SizeY are applicable to the buffers sent.

Since the top, bottom, left, and right border pixels of the image buffer cannot be in the center of a kernel, by definition, data from the first pass on the first row is used for the top two pixels, not the center pixels. The second pass is one row down from the first pass to put the pixels of interest in the center of the kernel. Subsequent row passes are incremented by two to keep the four pixel kernel of interest in the center until the bottom row, where the increment is one, and the last row pass are used to get data for the two bottom rows. The input map buffer is assumed to be allocated for the required size.

Similarly, a function is provided within the Analysis Workers to make a color Terrain Map. For each 2×2 kernel of pixels in the input buffer, a Terrain Map is filled out with six bytes of data describing the relationships of each of the three colors for the 16 pixels in a 4×4 kernel surrounding the 2×2 kernel. Quadrants and pixels are numbered as in the function that creates a mono Terrain Map. The color map is similar to three mono maps with identical elements and an additional two elements for color direction and color degree as described in greater detail below. The following are elements used in the function that creates a color Terrain Map:

Average Altitude: Average value of the four pixels in the center 2×2 kernel.

Degree of Slope: Absolute difference, in percent, between the highest average value of the four 2×2 quadrants in the 4×4 kernel and the lowest average value quadrant.

Figure 6:
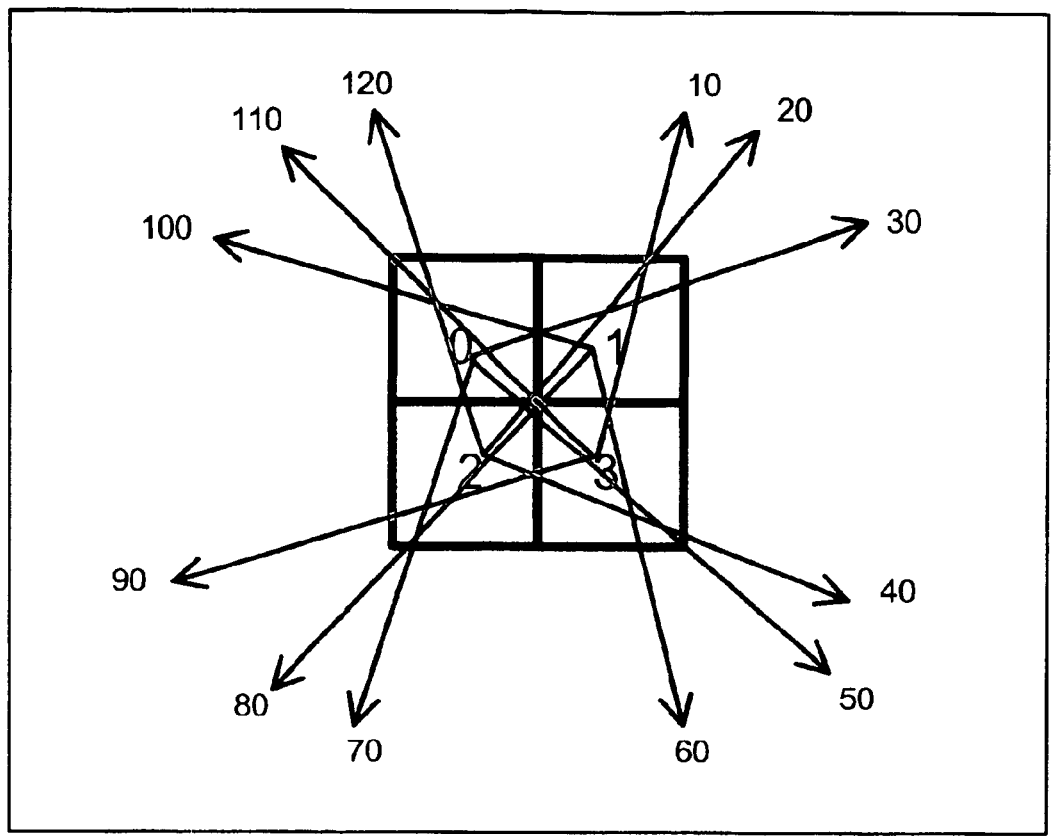
FIG. 6 is a view illustrating the determination of the Direction of Slope, allowing 120 degrees to fit into four bits, in accordance with the present invention.

Direction of Slope: Direction of the slope between the highest and lowest quadrants used to define the Degree of Slope. Direction of slope is determined as shown in FIG. 6, where the values are one third of the degrees to allow 120 to fit into four bits where 360 would require eight bits.

Horizontal Smoothness: A measure of how consistently the pixels change in the horizontal direction from the lowest pixel to the highest.

Vertical Smoothness: A measure of how consistently the pixels change in the vertical direction from the lowest pixel to the highest.

Jaggyness: A measure of how much interlace distortion (jaggyness) has been caused by motion between the odd and even fields of the frame.

Color Degree: A measure of how far the color is from a gray scale. Color Degree is zero for full white or full black and 255 for any one color fully.

Color Direction: A measure of the tint of the color. In a color map known in the art, yellow is zero degrees, and proceeding counter clockwise, red is 45 degrees, magenta is 90 degrees, blue is 180 degrees, and green is 270 degrees. The direction is stored internally as 0 to 127.

Color Space

Prior art image analysis which employs segmentation based on color differences requires a measurement where numbers representing different colors have a numerical difference that is proportional to the perceived differences between the colors. Raw RGB (red green blue) values cannot be used for segmentation because there are three numbers for each RGB set and different combinations of Red, Green, and Blue can be mixed to create the same color.

Figure 7:
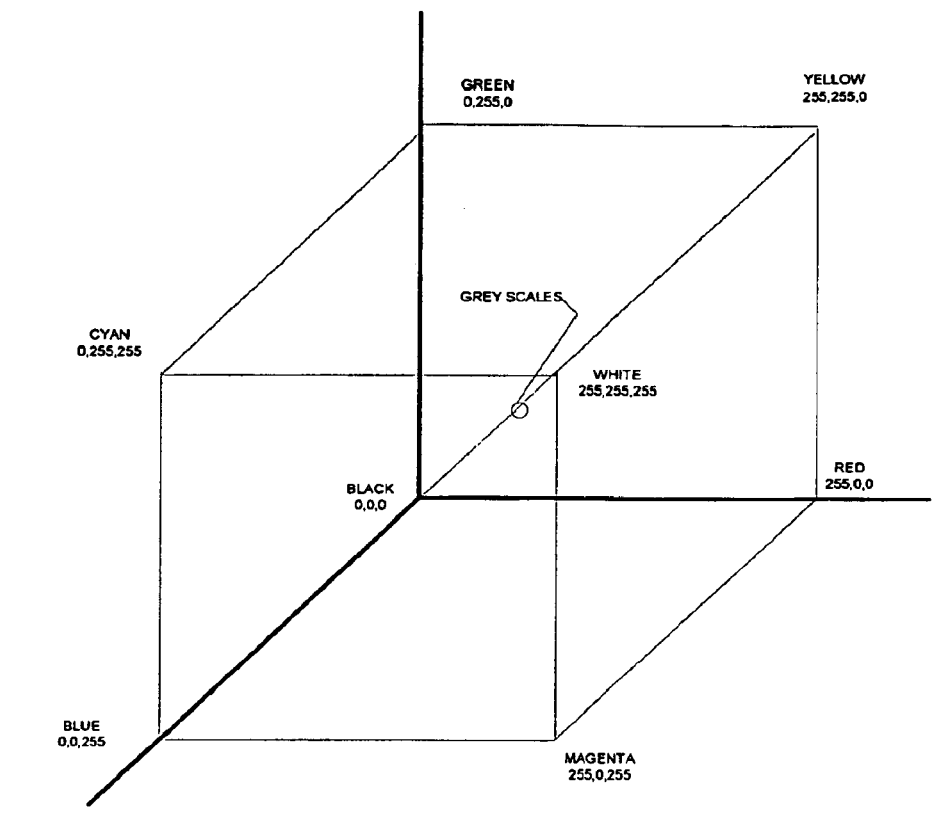
FIG. 7 is a diagram of a three-dimensional color space used for image analysis calculations according to the prior art.

RGB values can be compared by plotting both RGB sets in three dimensional space where the three axes are: Red, Green, and Blue. As shown in FIG. 7, the origin of the cube where all values are zero is full black, and the corner diagonally opposite where all values are 255 is white. The line between the black corner and the white corner is the neutral axis. All gray scales (From 0,0,0 to 255,255,255) lie on the neutral axis.

The distance from the neutral axis is the measurement of color saturation. On the neutral axis, R, G, and B are all equal resulting in a gray scale with no color saturation. At the extreme distance from the neutral axis, (255 as shown in FIG. 2), at least one of the RGB set is zero and at least one of the set is 255, resulting a fully saturated color.

Angular displacement from the neutral axis is the measurement of hue. Equal hues are defined as the surface described by the neutral axis and any point on the surface of the cube. Equal hues correspond to the perception of the "same color" under different conditions. The areas nearest the neutral axis are more washed out or pastel, and the areas farthest from the axis are more vivid. Areas nearest the black end of the axis are as perceived under dim lighting, and nearest the white end as perceived under bright lights.

Using this RGB cube for segmentation, RGB sets that have about the same angular displacement from the neutral axis are about the same color, and RGB sets that are about the same distance from the neutral axis are approximately the same saturation. Correspondingly, the three dimensional calculations are computationally expensive and produce more results than are used for segmentation by hue and saturation.

As opposed to the prior art that calculates a color space in three dimensions, the image analysis techniques of the present invention use only two dimensions, namely, Green minus Red and Blue minus Red. Each axis is scaled from −255 to +255. Since only the differences are plotted, one position in the plot for each balance in the R, G, and B values results. All of the 256 gray scales in the RGB cube are collapsed into a single point at the 0, 0 origin of the plot. Likewise each line in the RBG cube representing equal hue and saturation is collapsed into a single point. As a result of plotting (or calculating) only the values of interest for segmentation, this new two dimensional color space plots all of the 16,772,216 RGB combinations in only 195,075 positions.

In the new color space, Color Direction is equivalent to hue and is measured by the angular displacement around the origin of the plot. Color Degree is equivalent to saturation and is measured by distance from the origin. Note that all of the gray scales from full black to full white plot in the same position in the color space, the origin where there is no color information to use in segmentation.

Figure 8:
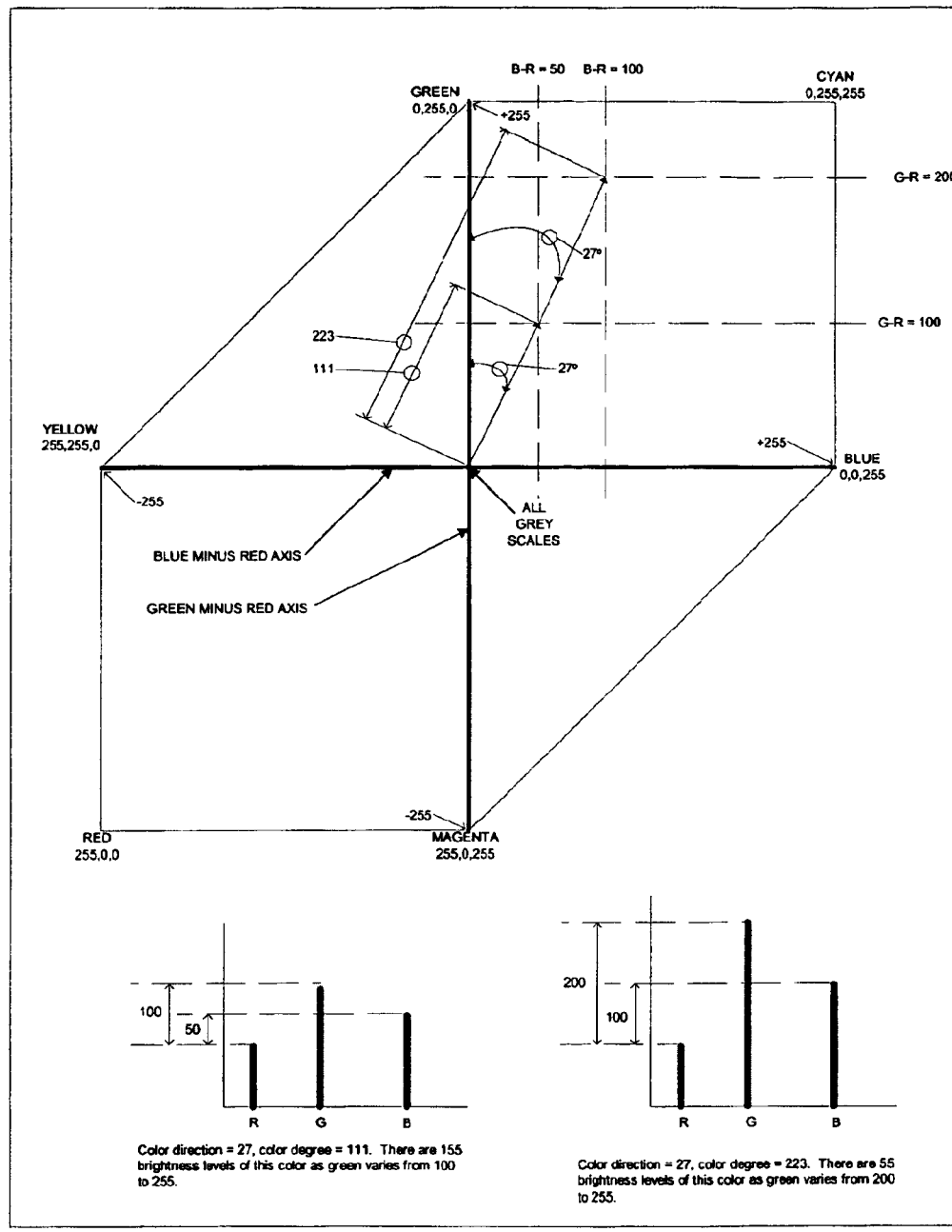
FIG. 8 is a diagram of a two-dimensional color space used for image analysis calculations according to the present invention.

As shown in FIG. 8, two points are plotted with the same color balance, with Blue being halfway between Red and Green. Green minus Red in one case is 100, in the other case 200. Since both points have the same color balance they plot to the same color direction (27 degrees). Since the point where Green minus Red is 200 has more differences in the RGB components, it has a higher degree of color (223 compared to 111).

In the example case of G-R=100, and B-R=50, there are 155 brightness levels that will plot to the same position in the color space as Green varies from 100 to 255. All of these brightness levels have the same hue and saturation. Brightness is handled in the color space simply as (R+G+B)/3.

Figure 9:
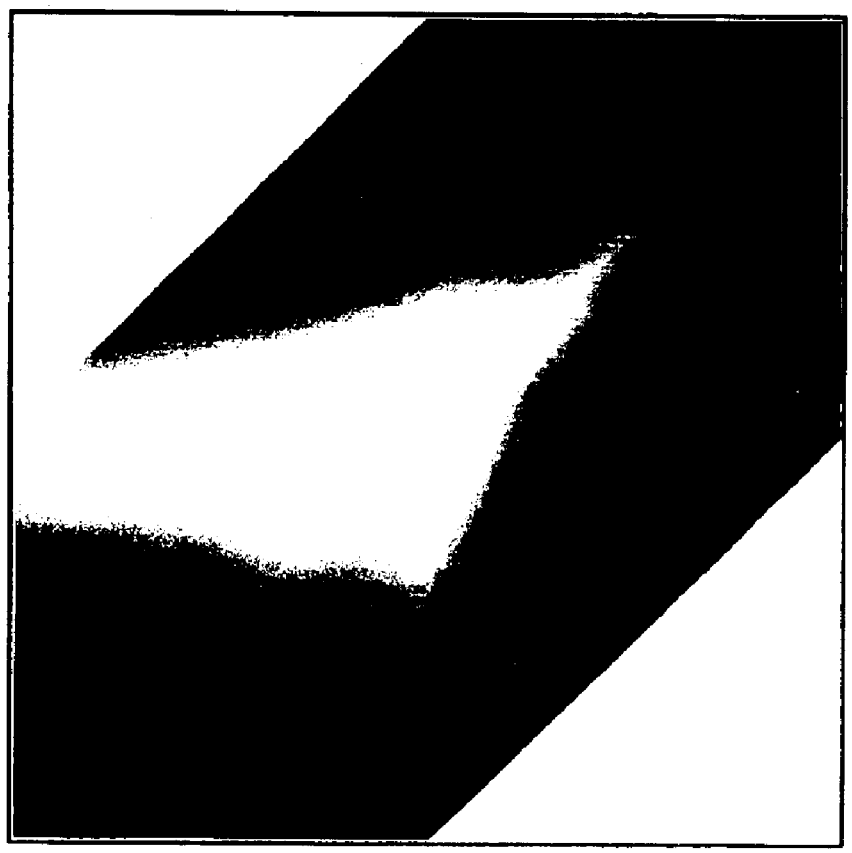
FIG. 9 is a color map illustrating the two-dimensional color space according to the present invention.

In the color map shown in FIG. 9, the two example points fall on a line from the point of origin to a point on the perimeter about halfway between Cyan and Green. By examination it may be seen that any line between the point of origin and any point on the perimeter passes through many saturation levels of the same hue. When used for color segmentation, the relatively simple 2D calculation yields the same result as the computationally more expensive 3D calculations.

Figure 10:
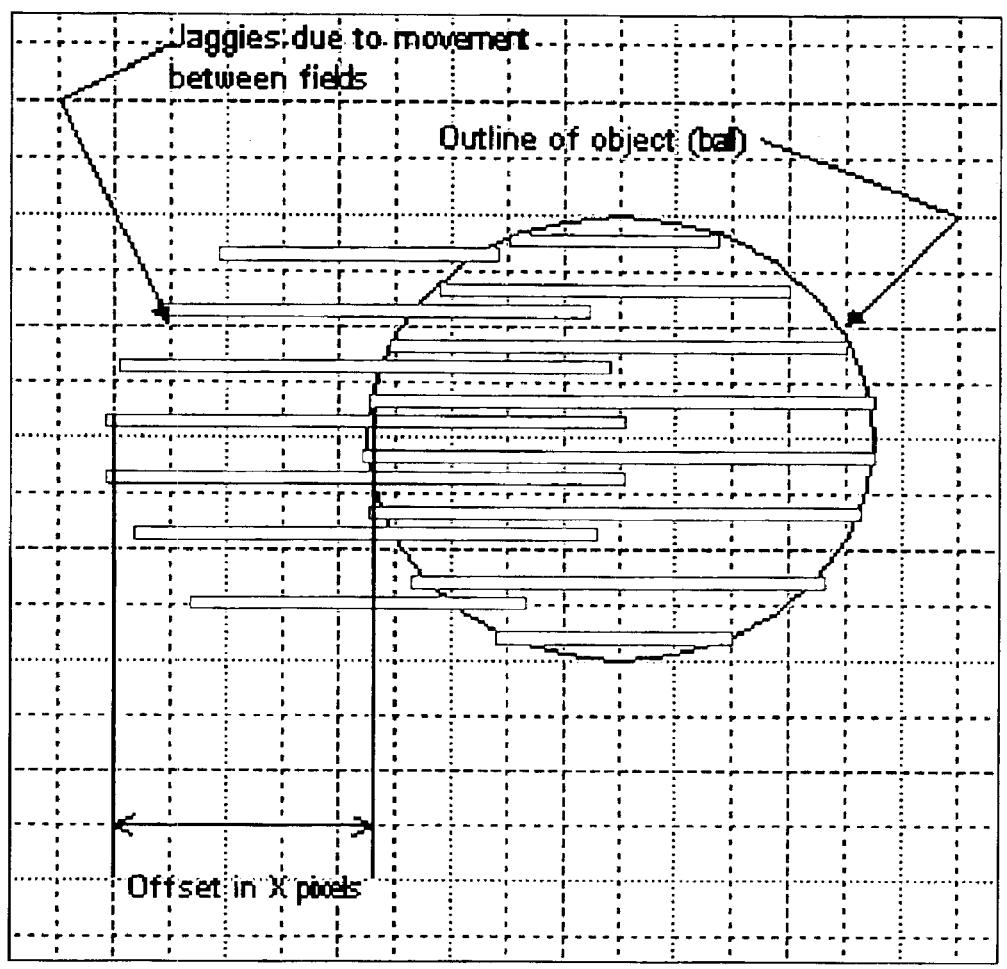
FIG. 10 is a view of the offset in pixels between the odd and even fields for a given target already segmented from a video frame according to the present invention.

A further function is implemented in the preferred embodiment of the present invention to measure the offset in pixels between the odd and even fields for a given target already segmented from a video frame. A bounding rectangle is determined and a target mask is created, wherein the target mask is the input to this function. An additional function determines whether a jaggy pattern exists. As shown in FIG. 10, the jaggyness is depicted where the offset in pixels is used to determine how fast a target is moving and the direction of the target, comparing odd to even fields. Two buffers are allocated and freed by the jaggyness function, one for the even scan lines and one for the odd scan lines. The two buffers are template matched to the best fit and the required offsets are placed in argument pointers.

Yet a further function of the present invention removes shadow and glare by utilizing the bounding rectangle of the test image that is given by the argument row and column of the Target Data array. The bounding rectangle is scanned with 5×5 kernels of pixels. If all pixels in the kernel are marked in the segmented buffer as target pixels, they are tested to see if they are shadow or glare as a group of 25. If the kernel is considered to be shadow or glare, all of the 25 pixels in the segmented image are set to zero. The following is the test for shadow or glare: The difference array of 25 elements (Background−Test) must all be either positive (shadow) or negative (glare). The difference (Background−Test) kernel must be smoother than the corresponding 25 pixels in either the background or the test image. Roughness is calculated by adding the differences from one pixel to the next. After calculating the roughness number for the Test, Background, and difference kernels, the difference must have the lowest roughness (most smooth) number to be considered as shadow or glare. The bounding rectangle is reset if pixels are removed from the segmented image. The remove shadow and glare function can be used with either color or mono files depending on the headers received.

Another function scans targets in labeled frames by row and keeps statistics for each target for each ⅕ of the height of the target for:

Smoothness: For each pixel scanned in the target, the corresponding pixel in the original image is examined for a change compared to the adjacent pixel. If every pixel in the original image is different from the adjacent pixel, the smoothness is 0%. If all pixels in the original image are the same value, the smoothness is 100%. A smoothness number is kept for each ⅕ of the height of the target.

Figure 11:
FIG. 11 is a view showing hatched areas used by an image analysis function to count pixels according to the present invention.

Percent Gap: Counts the pixels of the background that are between sections of the target. A count is kept for each ⅕ of the bounding rectangle from top to bottom, and is used to deduce the presence of legs or wheels. As shown in FIG. 11, Percent Gap counts the number of pixels in the hatched area.

Percent Fill: Percent of the bounding rectangle that has labeled pixels.

Percent Jaggy: Percent of the target's Terrain Map structures that have Jaggyness above a threshold value.

Figure 12:
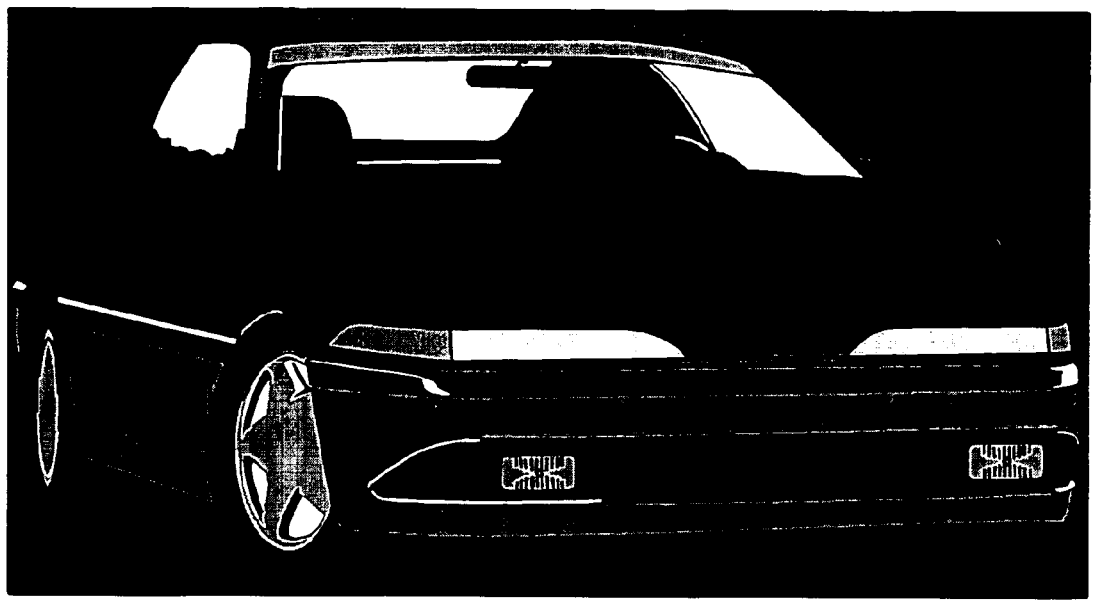
FIG. 12 is a view showing an image of only the target without the background used by image analysis functions according to the present invention.

While scanning each target, an all black buffer is allocated according to the size of the bounding rectangle. While scanning, all corresponding pixels are transferred from the original image that are inside the edge outline to the target mask. As a result, an image is produced of just the target without the background as shown in FIG. 12. If the original image is color, only the brightness levels (R+B+G/3) are transferred.

Each instance of Analysis Workers 30 are handled by Video Supervisor 32 as an object in an array. There is no arbitrary limit to the number of Analysis Workers 30 that Video Supervisor 32 can handle. Video Supervisor 32 must be in the same machine as Analysis Workers 30 because all Analysis Workers 30 operate on image data placed in shared memory by Video Worker 34 that runs in the same process space as Video Supervisor 32.

All communications between Video Supervisor 32 and Analysis Workers 30 are handled by the properties, methods and events of Analysis Workers 30. Additional functions, properties, methods and events of the Analysis Workers may be added to the MotionSentry.DLL to further support the image analysis techniques as set forth above and communications with the Video Supervisor as set forth in the following.

Video Supervisor

Video Supervisor 32 modules are ActiveX DCOM components that act as servers to the Node Managers. There is one Video Supervisor 32 for each frame grabber. Video Worker 34 is an OCX control that plugs into Video Supervisor 32, and will execute in the same process. In one known embodiment, the OCX controls will be specific for a Meteor II frame grabber card. The Meteor II frame grabber card has four camera inputs multiplexed to the same digitizer. The PCS system is configured such that frame grabber cards can be interchangeable.

Video Worker 34 maintains four current frames in shared memory, one for each camera. Video Supervisor 32 keeps track of when frames are available and when Analysis Workers 30 are ready for another frame, and direct traffic accordingly. The interface between Analysis Workers 30 and Video Supervisor 32 is generic. If/when the Meteor II frame grabber card is replaced, only the Video Worker 34 control will have to be further developed. Analysis Workers 30 are handled as an array of objects in Video Supervisor 32. There is no arbitrary limit to the number of Analysis Workers 30 that one Video Supervisor 32 can handle.

Video Supervisor 32 acts as a server to Node Manager 36. All calls to a frame grabber DLL are made by Video Worker 34 that plugs into Video Supervisor 32 and runs in the same address space. All calls to handle the frame grabber and the associated video buffers pass through the frame grabber DLL. As a result, different frame grabber cards can be employed with changes only in the DLL.

Generally, the frame grabber DLL includes functions which allocate buffers for video frames, change the active channel, copy the contents of one buffer to another, allocate and free frame memory, acquire available frames, grab the next frame of video, initialize the video card, and set the initial configuration and associated control settings.

Figure 13:
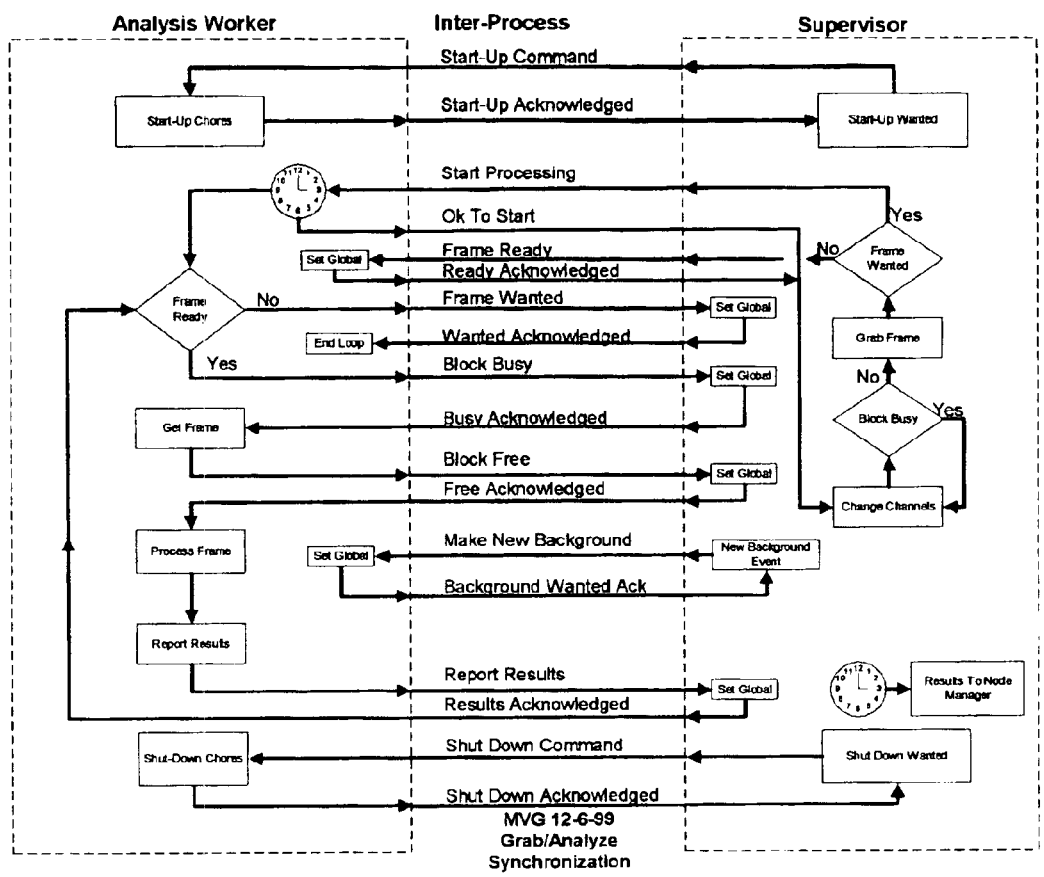
FIG. 13 is a flow chart illustrating the grab and analyze synchronization between the supervisor and the analysis worker according to the present invention.

Video Supervisor 32 coordinates the grabbing of frames with the analysis of frames. Each Video Supervisor 32 controls one frame grabber with one or more used inputs and as many instances of Analysis Worker 30 as there are used video inputs. The grabbing of frames between inputs must be synchronized because there is only one digitizer. FIG. 13 shows the grab/analyze synchronization between Video Supervisor 32 and Analysis Worker 30. The analysis of frames can be operated asynchronously because different views, with different targets, can take different times to process.

When processing is started, Video Supervisor 32 starts a do-loop, grabbing frames and changing channels. Only one thread is available for grabbing. If multiple frame grabbers are required in a single computer, then multiple instances of Video Supervisor 32 will be started. Each instance of Analysis Worker 30 will run in its own thread because each is a separate process. Communications between Analysis Workers 30 and Video Supervisor 32 are handled by setting properties in Analysis Worker 30 and asynchronous callbacks to Video Supervisor 32. Communications between grabbing threads and processing are handled by global arrays which generally provide when a frame is ready, when a frame is wanted, and when analysis workers 30 are busy.

Each instance of Video Supervisor 32 is handled by Node Manager 36 as an object in an array. There is no arbitrary limit to the number of Video Supervisors 32 that Node Manager 36 can handle. Video Supervisor 32 may be in the same machine as Node Manager 36, but the program structure assumes that it will be network connected and communicate by DCOM standards.

All communications between Video Supervisor 32 and Node Manager 36 are handled by the properties, methods and events of a Super Control Class module. The properties generally include commands to start workers, stop workers, start processing, stop processing, and quit. Corresponding methods of the Super Control Class module add and drop object references from Node Manager 36 for asynchronous callbacks.

Callbacks made to Video Supervisor 32 are by properties and methods of a Workers Report Class module. The methods of the Workers Report Class module generally include provisions for busy blocks, to verify that Analysis Workers 30 remain on line after no activity, and to notify Video Supervisor 32 when Analysis Workers 30 are ready for the next frame to process.

Additional functions, properties, methods and events of Video Supervisor 32 may be added to the frame grabber DLL to further support the frame grabbing techniques as set forth above and communications with other PCS system components.

Video Worker

Video Worker 34 is an ActiveX control (OCX) that plugs into Video Supervisor 32. All calls to the C++ functions in the frame grabber DLL are declared and made in Video Worker 34. All communications between Video Supervisor 32 and Video Worker 34 are through a limited set of high level properties, methods, and events of the ActiveX control. Properties of Video Worker 34 generally include provisions to map blocks of memory, initialize the video card, set or return the active channel of the frame grabber card, execute commands, including, but not limited to:

Clean Up—Performs all clean up operations such as freeing shared memory and shutting the frame grabber down.

Grab—Starts grab when current frame is finished.

Grab Frame to Share—Grabs a frame and places into shared memory.

Grab and Show—Grabs a frame and shows on a Video Worker form.

Hide Video Form—Hides the Video Worker form.

Show Video Form—Shows the Video Worker form.

Start Video—Initializes the frame grabber, allocates five frames, and set initial conditions.

Node Manager

Node Managers 36 are ActiveX, DCOM components that act as clients to Video Supervisors 32 and as servers to Arbitrator 40. The main purpose of Node Managers 36 is to concentrate the communications from many Video Supervisors 32, and decrease the total traffic that Arbitrator 40 has to handle. There is one Node Manager 36 for each rack of computers with Video Supervisors 32. Node Managers 36 handle Video Supervisors 32 as an array of objects. There is no arbitrary limit on the number of Video Supervisor 32 servers. Node Managers 36 calculate scores for cameras based on the events viewed by cameras and also on values set by the Set Rules GUI.

Set Rules GUI

Set Rules GUIs 38 are ActiveX, DCOM components that allow changing the system rules about what video is presented to which monitor. The system rules are stored in the rules database 41, as depicted in FIG. 2. For example, changing the dwell time for scenes with multiple people, or changing the operator console to receive video from a group of cameras in a parking structure.

Arbitrator

Arbitrator 40 is the client to Node Manager 36. Arbitrator 40 receives data from Node Managers 36 about what activities are present in the system, and reads the database regarding what activity should be presented to which monitor. Conflicts between available monitors and pending activity are arbitrated based on the priority rules, and cameras are called up based on the console to group assignment rules.

Additional System Components

Figure 14:
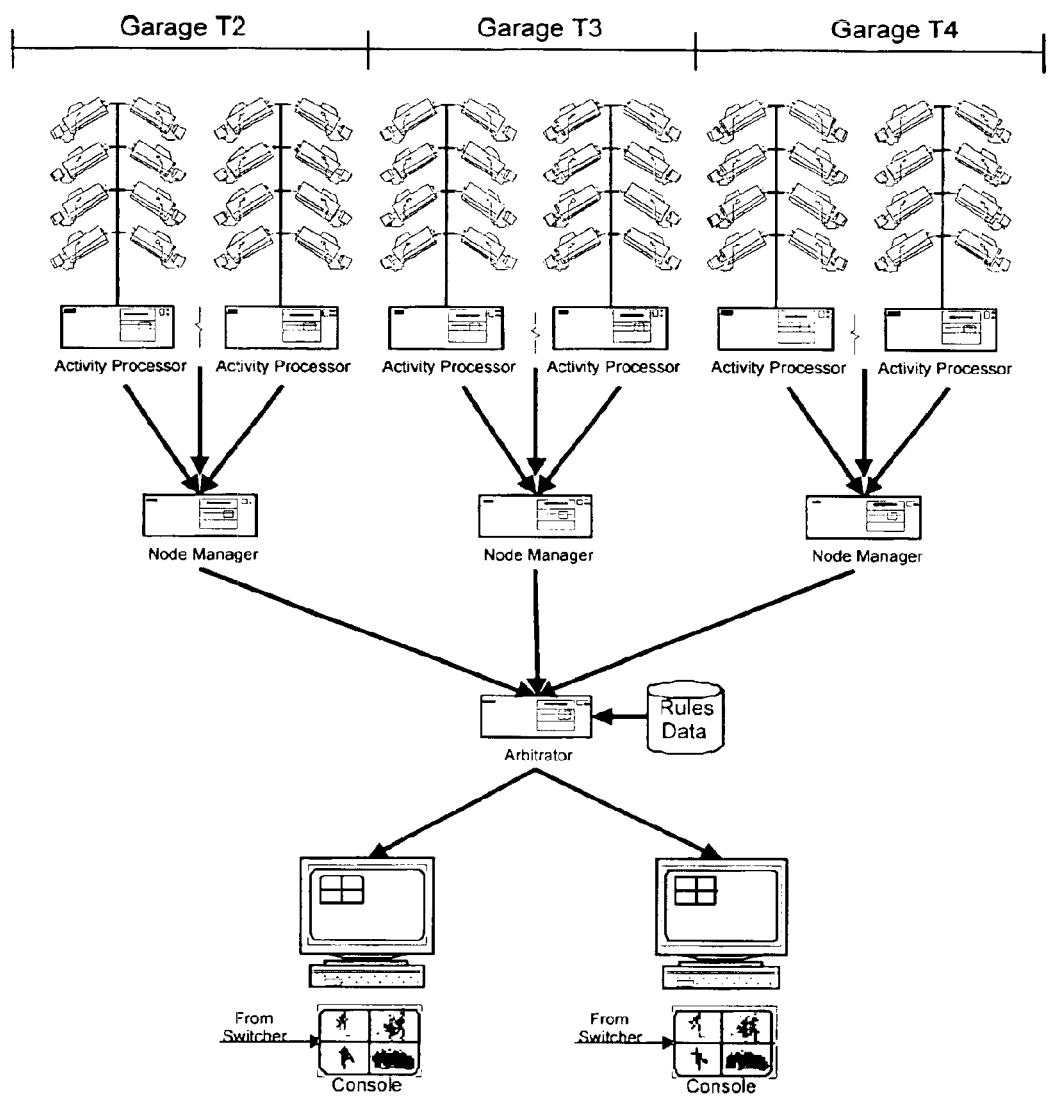
FIG. 14 is a hardware block diagram according to the present invention.

Referring to FIG. 14, additional hardware beyond the standard CCTV systems includes a video activity processor CPU with a frame grabber for each four cameras, one node manager computer for each rack location, and one port on the Local Area Network for each of the Video Activity Processors and Node Manager processors. The Arbitrator Processor shares the master computer of the CCTV system, and one copy of the Set Rules GUI resides on the GUI workstation in each of the three CCTV consoles.

In accordance with space limitations for the new system, and if permitted by available space, the video activity processors can be conventional rack mounted processors. For these processors, the system may use Pentium™ class processors available from Intel Corporation, or other high performance board-mounted processors, each capable of serving at least eight video cameras, i.e., controlling the acquisition of video output from such cameras. As an example, a system including processors for serving some 197 cameras in using dual on-board processors may require 26 processors, each if rack-mounted being 7 inches in height and requiring some 182 inches of rack space (about three full racks) and must include a monitor.

In a more densely configured installation, the video activity processors may instead be commercially available single-board computers ("SBCs") as heretofore used in industrial applications, so that, for example, eight computers in one chassis can serve 32 cameras. Other suitable processor configurations and types, either using complex instruction set (CISC) or reduced instruction set (RISC) software, may be employed.

Interfacing PCS system 10 to CCTV subsystem 12 is carried out by a single processor providing a computer interface with an otherwise pre-existing CCTV system, and SentryConnector is used to connect Arbitrator 40 to port server of CCTV subsystem 12. Thus, referring to FIG. 2, connections are established between each of four CCTV garage cameras 14 and Video Worker 34 module, which is in turn connected to Video Supervisor 32, which is itself then connected to a Node Manager 36.

CCTV garage cameras 14 are merely typical of possibly many video cameras of security system CCTV subsystem 12. There may for example be, as in the example given above, hundreds of such cameras. While the new system is especially well-suited for use in large-scale CCTV systems, as thus typified by hundreds of video cameras, it can also be used with small-scale CCTV systems having far fewer video cameras but where electronic analysis and supervision for controlling camera video presentation is to be carried out by PCS system 10.

Video signals representing the view of each of CCTV garage cameras 14 (as well as other video cameras of the system) are provided also to CCTV system 12, and thus are shown connected to distributed CCTV switches 16, which are illustrated as being supplied with video from cameras other than those shown. It should be appreciated that video outputs from all of the video cameras are provided to both PCS system 10 and to CCTV subsystem 12 simultaneously.

The term PCS system has been used arbitrarily in describing the present invention, but other designations may be employed. By using computers to pre-screen the cameras, only views with some event of interest to the operators will be selected to the call-up monitors.

System Operation

The computer interface between the two systems, i.e. PCS system 10 and CCTV subsystem 12, functions in the following manner, with reference to FIG. 2: PCS system 10 requests a camera call up to one of the inputs to quad splitter 26 shown below GUI workstation 24. (The interface arrow pointing down)

Image analysis by PCS system 10 does not depend on the CCTV switching system to be able to pre-screen the cameras, as the camera video goes to both systems independently. The CCTV switching system does not depend on PCS system 10 to present video to the four quad monitors (16 views) depicted at the bottom of operator console 20.

Because CCTV subsystem 12, even without PCS system 10, can function conventionally, when CCTV subsystem 12 is configured and tested for normal operation, the interface between Arbitrator 40 and the GSIS port server can be activated to test the operation of PCS system 10. With the CCTV switching system operational, and PCS system 10 operational, the automatic video call-ups for the video cameras, such as those used for garage surveillance, cause camera views to be displayed on the quad monitor shown with a video input to GUI workstation 24.

PCS system 10 provides video image analysis to decrease staffing requirements and (through reduced boredom) to increase the security of premises, such as garages, in which the new system is installed. PCS system 10 is software-based, with capability for image analysis in order to allow persons to be distinguished from vehicles. With knowledge in the system about where each camera is located, and what event the camera is viewing, the call-ups are based on a set of priority rules. For example, these rules may establish operation as follows for a security system of the present invention when installed in a garage complex:

Each camera is assigned a location identifier to allow selection of cameras to a particular console based on the garage it is in.

Each camera is assigned to a logical type group such as quiet aisle, entry aisle, or elevator lobby.

Event priorities are assigned to each logical group such as these situations:

Two or more persons in view converging from different start points.

One or more persons in view moving faster than normal.

Two or more persons in view, not converging.

One person walking alone.

Using a combination of location identifier and logical groups, the camera call-ups at each console can be customized to control operator loading. Garages may be assigned to individual consoles during daylight hours but during night hours all garages can be assigned to a single console. Vehicles such as cars might normally be ignored during some hours of operation, but during a shift which is especially boring because of lack of video monitor activity, vehicles can be added to the priority list to increase the frequency of monitor call-ups.

Set Rules GUI 38 can be included in each operator console 20 to allow setting the rules for camera call-up. Preferably, access to Set Rules GUI 38 will be subject to password authorization.

Additional call-up events can be provided for PCS system 10 and provided as upgrades. When information is available from image analysis, other more involved events may be available including situations such as:

A person has fallen down.

A person is walking erratically, such as may occur if "casing" cars or lost.

A person is taking too long to enter a car, which may represent break-in effort.

A car is moving faster than a preset percentage (e.g., 95%) of other cars in the same camera view during a recent time interval.

Each operator console 20 preferably will have a call-up monitor with four cameras displayed. A small "thumbnail" version of the four camera view is displayed on GUI workstation 24. Camera call-ups are automatic. Each camera view selected remains on the console for a dwell time period that is user selected and entered in the rules. If an operator desires to continue observing a specific camera view, a click on the quadrant of the thumbnail image on GUI workstation 24 will cause the selected camera to be switched to another larger monitor. For example, an operator can select the view of two running persons for display on the large monitor.

In view of the foregoing description of the present invention and practical embodiments it will be seen that the several objects of the invention are achieved and other advantages are attained. The embodiments and examples were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting.

The breadth and scope of the present invention should not be limited by any of the above-described exemplary embodiments, but should be defined only in accordance with claims of the application and their equivalents.

What is claimed is:

1. A method for real-time analysis of video image data for subject content, said method comprising the steps of:
    (a) performing at least one pass through a frame of said video image data; and
    (b) generating a terrain map from said pass through said frame of said video image data, said terrain map comprising a plurality of parameters wherein said parameters indicate the content of said video image data,
    said parameters comprising an average altitude parameter; a degree of slope parameter; a direction of slope parameter; a horizontal smoothness parameter; a vertical smoothness parameter; and a jaggyness parameter.

2. The method according to claim 1, wherein said parameters are generated by color space calculations, said color space calculations comprising a color degree parameter which measures how far a color is from gray scale.

3. The method according to claim 1, wherein said parameters are generated by color space calculations, said color space calculations comprising a color direction parameter which measures color based on a two-dimensional color analysis.

4. The method according to claim 1, wherein said average altitude parameter measures an average value of four pixels in the center of a 2×2 kernel in said frame of said video image data.

5. The method according to claim 4, wherein degree of slope parameter measures an absolute difference between a highest average value and a lowest average value calculated by said average altitude.

6. The method according to claim 4, wherein direction of slope parameter measures a direction of slope based on a highest average value and a lowest average value calculated by said average altitude.

7. The method according to claim 1, wherein horizontal smoothness parameter measures a consistency of change in horizontal direction from a lowest pixel to a highest pixel in said frame of said video image data.

8. The method according to claim 1, wherein said vertical smoothness parameter measures a consistency of change in vertical direction from a lowest pixel to a highest pixel in said frame of said video image data.

9. The method according to claim 1, wherein jaggyness parameter measures an offset in pixels between odd and even fields for a target segmented from said frame of said video image data.

10. The method according to claim 1, wherein said real-time analysis discriminates between vehicular traffic and pedestrian traffic.

11. The method according to claim 10, wherein said real-time analysis further comprises a maintain background function wherein a background is segregated from a moving target by averaging said video image data which contains no said moving target and said moving target is further analyzed to determine if said moving target is a pedestrian or a vehicle.

12. The method according to claim 1, wherein said real-time analysis recognizes at least one event which defines the presence of or change in a target within said video image data.

13. The method according to claim 12, wherein said events comprise one or more of the following:
    presence of a single person;
    presence of multiple people;
    fast person;
    fallen person;
    lurking person;
    erratic person;
    converging people;
    presence of a single vehicle;
    presence of multiple vehicles;
    fast vehicle; or
    sudden stop vehicle.

14. The method according to claim 1, wherein said parameters further comprise:
    a color degree parameter which measures how far a color is from gray scale;
    a color direction parameter which measures color based on a two-dimensional color analysis; and
    said average altitude parameter measures an average value of four pixels in the center of a 2×2 kernel in said frame of said video image data;
    said degree of slope parameter measures an absolute difference between a highest average value and a lowest average value calculated by said average altitude;
    said direction of slope parameter measures a direction of slope based on said highest average value and said lowest average value calculated by said average altitude;
    said horizontal smoothness parameter which measures a consistency of change in horizontal direction from a lowest pixel to a highest pixel in said frame of said video image data;
    said vertical smoothness parameter measures a consistency of change in vertical direction from a lowest pixel to a highest pixel in said frame of said video image data; and
    said jaggyness parameter measures an offset in pixels between odd and even fields for a target segmented from said frame of said video image data.

15. A method for real-time analysis of video image data for subject content, said method comprising the steps of:
    (a) performing at least one pass through a frame of said video image data; and
    (b) generating a terrain map from said pass through said frame of said video image data, said terrain map comprising a plurality of parameters wherein said parameters indicate the content of said video image data, wherein said parameters comprise:
    an average altitude parameter which measures an average value of four pixels in the center of a 2×2 kernel in said frame of said video image data;
    a degree of slope parameter which measures an absolute difference between a highest average value and a lowest average value calculated by said average altitude;

direction of slope parameter which measures a direction of slope based on said highest average value and said lowest average value calculated by said average altitude;

a horizontal smoothness parameter which measures a consistency of change in horizontal direction from a lowest pixel to a highest pixel in said frame of said video image data;

a vertical smoothness parameter which measures a consistency of change in vertical direction from a lowest pixel to a highest pixel in said frame of said video image data; and a jaggyness parameter which measures an offset in pixels between odd and even fields for a target segmented from said frame of said video image data.

16. A method for real-time analysis of video image data, said method comprising the steps of:
   (a) performing a single pass through a frame of said video image data; and
   (b) generating a terrain map from said pass through said frame of said video image data, said terrain map comprising a color space calculation wherein said color space calculation comprises:
   a color degree parameter which measures how far a color is from gray scale; and
   a color direction parameter which measures color based on a two-dimensional color analysis.

17. A computer system for automated screening of security cameras, said computer system in communication with a plurality of video cameras and comprising real-time image analysis components wherein video image data from said video cameras is analyzed by said image analysis components and said video image data is then selectively presented to an operator for security monitoring, said system providing real-time analysis of said video image data for subject content and including:
   (a) provision for performing a at least one single pass through a frame of said video image data; and
   (b) provision for generating a terrain map from said pass through said frame of said video image data, said terrain map comprising a plurality of parameters wherein said parameters indicate the content of said video image data,
   said parameters comprising an average altitude parameter; a degree of slope parameter; a direction of slope parameter; a horizontal smoothness parameter; a vertical smoothness parameter; and a jaggyness parameter.

18. A method for real-time analysis of video image data for subject content, said method comprising the steps of:
   (a) performing at least one pass through a frame of said video image data; and
   (b) generating a terrain map from said pass through said frame of said video image data, said terrain map comprising a plurality of parameters wherein said parameters indicate the content of said video image data,
   said terrain map containing in said plurality of parameters characteristic information regarding the content of the video, the characteristic information being based on each of kernels of pixels in an input buffer, the characteristic information comprising at least a number of bytes of data describing the relationship of each of a plurality of pixels in a larger kernel surrounding the first-said kernel.

19. A computer system for automated screening of security cameras, said computer system in communication with a plurality of video cameras and comprising real-time image analysis components wherein video image data from said video cameras is analyzed by said image analysis components and said video image data is then selectively presented to an operator for security monitoring, said system providing real-rime analysis of said video image data for subject content and including:
   (a) provision for performing at least one pass through a frame of said video image data; and
   (b) provision for generating a terrain map from said pass through said frame of said video image data, said terrain map comprising a plurality of parameters wherein said parameters indicate the content of said video image data;
   said terrain map containing in said plurality of parameters characteristic information regarding the content of the video, the characteristic information being based on each of kernels of pixels in an input buffer, the characteristic information comprising at least a number of bytes of data describing the relationship of each of a plurality of pixels in a larger kernel surrounding the first-said kernel.

20. A computer system according to claim 19, wherein said parameters comprise:
   an average altitude parameter which measures an average value of four pixels in the center of a 2×2 kernel in said frame of said video image data;
   a degree of slope parameter which measures an absolute difference between a highest average value and a lowest average value calculated by said average altitude;
   direction of slope parameter which measures a direction of slope based on said highest average value and said lowest average value calculated by said average altitude;
   a horizontal smoothness parameter which measures a consistency of change in horizontal direction from a lowest pixel to a highest pixel in said frame of said video image data;
   a vertical smoothness parameter which measures a consistency of change in vertical direction from a lowest pixel to a highest pixel in said frame of said video image data; and
   a jaggyness parameter which measures an offset in pixels between odd and even fields for a target segmented from said frame of said video image data.

21. A computer system according to claim 20, wherein said parameters are generated by color space calculations, said color space calculations comprising a color degree parameter which measures how far a color is from gray scale,
   said color space calculations further comprising a color direction parameter which measures color based on a two-dimensional color analysis.

* * * * *

UNITED STATES PATENT AND TRADEMARK OFFICE
CERTIFICATE OF CORRECTION

PATENT NO. : 6,940,998 B2
DATED : September 6, 2005
INVENTOR(S) : Maurice V. Garoutte It is certified that error appears in the above-identified patent and that said Letters Patent is hereby corrected as shown below:

Column 23,
Line 51, after "wherein", insert -- said --.

Column 24,
Line 40, delete "which".

Column 25,
Line 39, delete "single".

Signed and Sealed this

First Day of November, 2005

JON W. DUDAS
*Director of the United States Patent and Trademark Office*